Oct. 21, 1941.　　L. E. NOFSINGER　　2,260,153
APPARATUS FOR HYDROCARBON CONVERSION
Filed Dec. 21, 1939　　2 Sheets-Sheet 1

FIG.1-K-K

INVENTOR
L. E. NOFSINGER
BY
Walter H. Borcherding
ATTORNEY

Oct. 21, 1941.  L. E. NOFSINGER  2,260,153
APPARATUS FOR HYDROCARBON CONVERSION
Filed Dec. 21, 1939   2 Sheets-Sheet 2

FIG. 3-G-G

INVENTOR
L. E. NOFSINGER
BY
Walter H. Borcherding
ATTORNEY

Patented Oct. 21, 1941

2,260,153

UNITED STATES PATENT OFFICE 2,260,153

APPARATUS FOR HYDROCARBON CONVERSION

Lewis E. Nofsinger, Livingston, N. J., assignor to The M. W. Kellogg Company, Jersey City, N. J., a corporation of Delaware Application December 21, 1939, Serial No. 310,274

9 Claims. (Cl. 196—52)

The present invention relates to apparatus for the catalytic conversion of hydrocarbons by a continuous cyclic process comprising alternate stages of hydrocarbon conversion and catalyst regeneration, in which carbonaceous by-products are deposited upon a solid catalyst during the conversion stages and burned off during the regeneration stages.

More particularly, the invention is concerned with catalytic apparatus including means for recovering heat from the hot products of combustion evolved during regeneration stages, and means for admixing a portion of the cooled combustion products with the air being admitted to the combustion, whereby overheating of the catalyst may be prevented.

In practicing processes of this type, it has been heretofore proposed to recover heat evolved during the regeneration stages by apparatus comprising one or more vessels for containing the catalyst and a separate heat-recovery device such as an economizer or waste heat boiler, and to pass combustion gases to and from the vessels and the heat-recovery equipment through exposed conduits. Because of temperature variations during the process cycle it has been necessary to equip these conduits with devices for absorbing thermal expansion and contraction, such as slip joints or flexible loops. With the relatively large size conduits required to handle great volumes of hot gas, such devices become extremely expensive. One of the objects of my invention is to provide a unitary type of apparatus in which no exposed conduits are used and in which, consequently, no expansion devices are needed.

Another difficulty overcome by the present invention arises from the fact that a body of catalyst opposes frictional resistance to the passage of gases therethrough. When flue gas is to be recirculated through a catalyst bed for temperature control during regeneration, the power consumed in overcoming pressure drop through the catalyst is excessive unless the volume of the gas is reduced by maintaining a positive super-atmospheric pressure on the entire recirculation system. Taking into account the cost of the power expended in compressing the fresh air introduced for combustion up to the system pressure, there will be an economic optimum pressure under any given circumstances lying between about 25 and 100 pounds per square inch. When external conduits are used, they must of course be strong enough to withstand this pressure; their areas are large and their cost is excessive. Pursuant to this invention the conduit wall area is minimized. A large percentage of it is not required to withstand any appreciable pressure and hence may be of relatively light and inexpensive construction.

A further object of the invention is to permit simple and inexpensive valves, such as butterfly valves, to be used in controlling the flow of gas to and from the heat recovery system, in place of the expensive ones normally required.

Various other objects and advantages of the invention will be apparent from the following detailed description thereof given in connection with the appended drawings, wherein:

Fig. 1 is a longitudinal sectional view of a preferred form of the combined reactor and heat exchanger;

Fig. 1—KK is a cross-sectional view of apparatus shown in Fig. 1;

Figure 3:
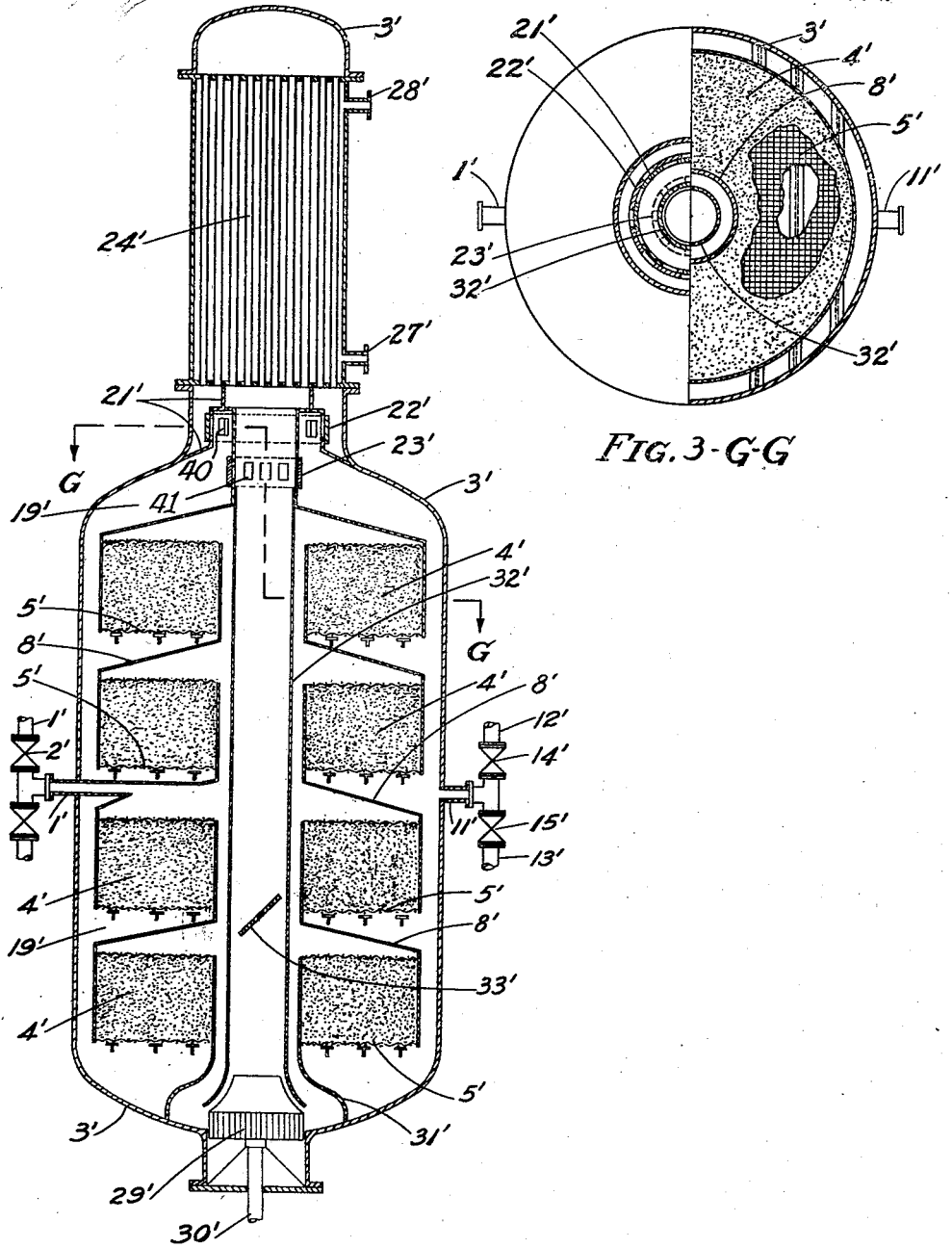
Fig. 3 is a longitudinal sectional view of a modified form of the combined reactor and heat exchanger.

Fig. 3—GG is a cross-sectional view of the apparatus shown in Fig. 3.

The apparatus includes a fluid-tight metallic housing shell, or envelope capable of withstanding the highest pressures desired to be employed in conversion and regeneration. Within this shell are located the catalyst, disposed in a bed or beds or in tubes or in any suitable manner, and a heat-exchanger comprising heat transferring surfaces adaptable to the exchange of heat between hot gaseous combustion products and an extraneous fluid. The heat-transferring surfaces may be on the inside or outside of tubes respectively surrounded by or containing oil to be heated or water to be converted into steam, for example, in fact, any known type of heat exchanger construction for exchanging heat between a gas and another fluid may be used. Connections to the shell are provided for the passage of hydrocarbons to be converted into contact with the catalyst and for the withdrawal of the conversion products. A feature of the invention is the provision of interior walls or partitions within the shell which define fluid-conducting passageways connecting the space containing the catalyst with the heat-transferring surfaces.

Since these partitions serve but to isolate two streams of gas flowing in opposite directions under the same pressure, they may be of light and inexpensive construction.

The passageways are preferably provided with valves which may be closed to isolate the catalyst space from the heat recovery space during the conversion periods, or opened during the regeneration periods for the passage of hot combustion gases from the catalyst space to the heat-exchanging surfaces and the recirculation of a cooled portion thereof in admixture with air for combustion to the catalyst space. Recirculation of the cooled gas and air is obtained by suitable impeller means, such as a fan or blower, mounted in one of the passageways traversed by the gases and suitably located connections are provided for introducing air and withdrawing unrecirculated combustion gases.

Figures 1, 2:
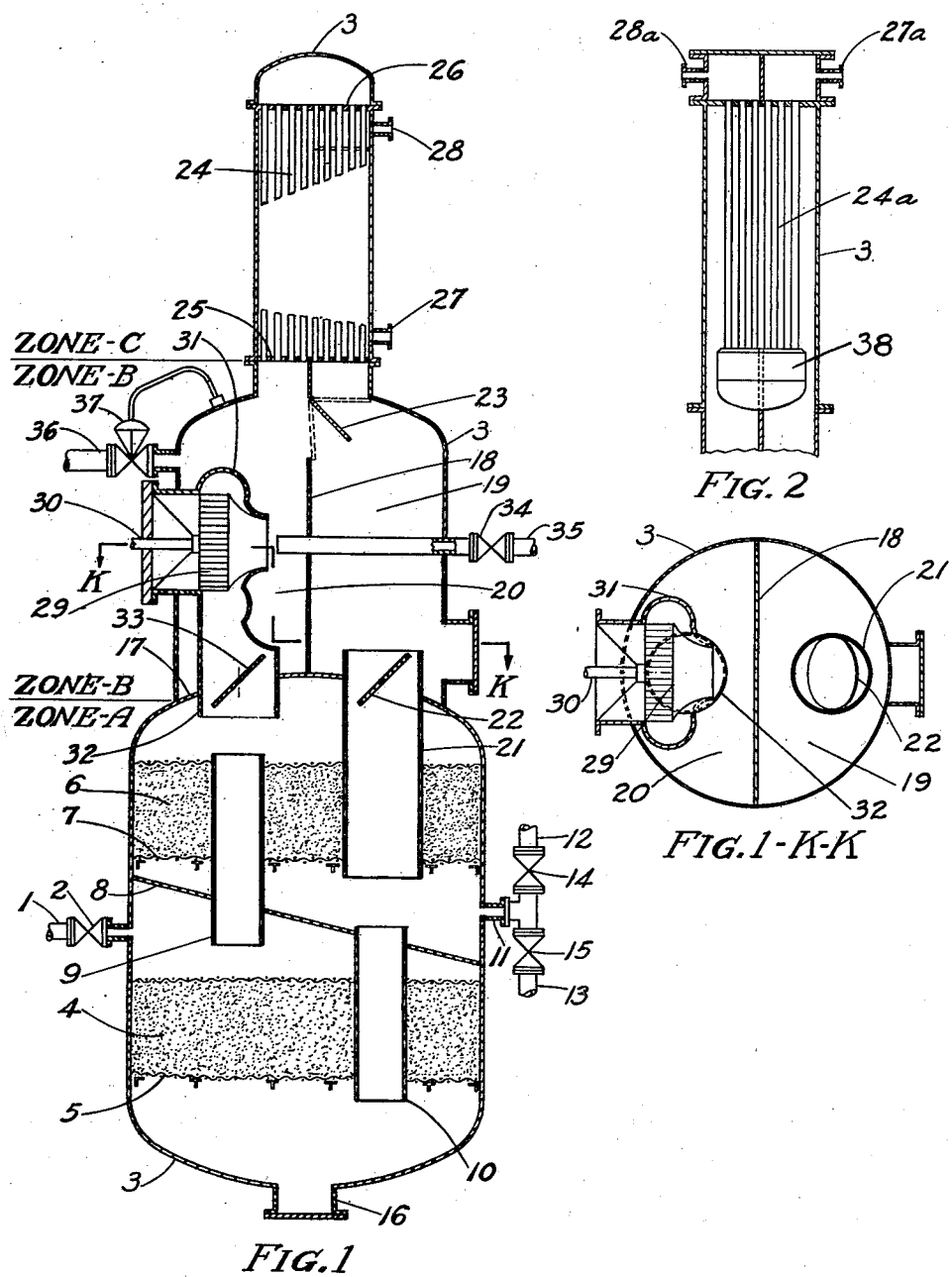
Fig. 2 is a longitudinal sectional view of a modified form of heat exchanger suitable for use in the combination.

Fig. 1 represents a preferred embodiment of the invention as applied to the catalytic cracking of hydrocarbon oils for the production of motor fuel. It will facilitate the explanation to consider the apparatus as being divided into three sections or zones. The lower third of the apparatus in which its width is the greatest will be referred to as zone A, the catalyst zone. The middle portion of the apparatus, of intermediate width, will be referred to as zone B, the recirculation zone; and the topmost, narrowest portion will be referred to as zone C, the heat recovery zone. Their positions relative to each other are merely exemplary, as the apparatus could be operated in an inverted or horizontal position; also zones A and C could be placed side by side with zone B adjacent to them. It is, of course, preferable that the zones be situated so that they may be enclosed within a common shell of simple and compact shape. Also, it will be understood that not all embodiments of the invention would be so easily divisible into distinct zones, for elements of zone B may enclose or be enclosed by zone A.

Considering first zone A, the catalyst zone, it will be seen that line 1, provided with valve 2, enters the shell 3 and communicates with the upstream side of a catalyst bed 4 resting upon a pervious supporting surface 5. This supporting surface may be a wire screen resting upon transverse structural members carried by the shell, as shown, or a reinforced perforated plate or the like. A second catalyst bed 6 resting upon a similar supporting surface 7 is arranged above and in parallel-flow relationship with lower bed 4 and is separated therefrom by a sloping transverse partition 8. Parallelism of flow downward through beds 4 and 6 with respect to fluids entering through line 1 is obtained by means of a pipe 9 which projects through partition 8, support 7, and bed 6, and provides unobstructed access between the upstream sides of the two beds. Also, a pipe 10 projecting through support 5, bed 4, and partition 8 provides for fluid-conducting intercommunication of the downstream side of bed 4 with the downstream side of bed 6 and with an outlet line 11. Line 11 branches into lines 12 and 13 outside the shell, which are provided with valves 14 and 15 respectively. Parallelism of flow through the two beds is not an essential feature of the invention, however, and series flow may be substituted if desired by connecting the upper end of pipe 10 with the lower end of pipe 9 instead of extending pipe 10 through partition 8 as shown. Also, if desired, means may be readily provided whereby the flow may be alternated between parallel and series flow, for example parallel flow during conversion and series flow during regeneration, by the provision of a pipe below partition 8 for interconnecting pipes 9 and 10, and provided with suitable dampers or valves for diverting gas through the interconnecting pipe from pipe 10 to pipe 9 when series flow is desired.

A manhole 16 affords access to the lower portion of the combined reactor-heat exchanger.

Zone B, the combustion gas recirculation zone, is enclosed by the shell 3 and is separated from zone A by a transverse partition 17. A vertical partition 18 divides zone B into two approximately semi-cylindrical passages 19 and 20. Passage 19 is connected with the downstream side of the two catalyst beds in zone A by a pipe 21 which projects through partition 17, catalyst bed 6, and support 7. This pipe is provided with a butterfly valve 22 operable from the exterior of the shell which, when closed, cuts off passage 19 from zone A. A semicircular plate 23 is suspended from a hinge with its circular side downward and when in the vertical position covers a hole of similar shape in partition 18. As this plate is swung to the right and upward it permits an increasing flow from passage 19 to passage 20, by-passing zone C. In its uppermost horizontal position it contacts the periphery of the shoulder of a constriction in the shell 3 and cuts off zone C from passage 19 completely. The vertical and horizontal positions of plate 23 are shown in dotted lines on the drawings.

The upper ends of passages 19 and 20 are terminated by a tubesheet 25 which may be considered the boundary between zones B and C. Zone C is enclosed by a metallic shell which is suitably flanged and bolted onto the main enclosing envelope 3 forming a separable section thereof. Its internal construction is substantially identical with that of a shell and tube heat exchanger having two passes through the tubes. In this case the tubes 24 are held between a lower tubesheet 25 and an upper tubesheet 26, and are divided into two passes by the upper end of partition 18; a channel connecting the two passes at the top of the zone is defined by upper end of the shell 3. This construction permits flow upwardly from passage 19 through the right half of the tube bundle, across the channel and downwardly through the left half of the bundle into passage 20. Nozzles 27 and 28 communicate with the shell side of the tubes and provide for the introduction and withdrawal of a fluid, such as water, to be heated by hot gases passing through the tubes.

Returning now to zone B, passage 20 communicates with the suction intake of a centrifugal fan 29 driven by any suitable means, such as an electric motor, through a shaft 30 extending through shell 3. Fan 29 is mounted on the inner wall of the shell and is housed in a volute casing 31 which discharges into a pipe 32. Pipe 32 projects from zone B through partition 17 and communicates with the upstream side of the catalyst beds 4 and 6. A butterfly valve 33 controls flow through pipe 32. A pipe 35 has one end opening adjacent the intake of fan 29 and extends through partition 18 and the shell. Outside the shell pipe 35 is provided with valve 34. An external line 36 connected with passage 20 is provided with pressure-control diaphragm valve 37 responsive to the pressure within the apparatus.

Figure 1—KK is a sectional view of the apparatus shown in Figure 1, taken through zone B along the lines indicated. The conformation of the apparatus will be more readily understood by referring to Figure 1—KK, in which like characters designate like elements of the construction.

Fig. 2 illustrates an alternate form of zone C, Figure 1, in which the paths of the hot flue gas and cooling medium relative to each other are reversed. Flue gas makes a single transverse pass through the shell and around the tubes 24a while the cooling medium enters through nozzle 27a, makes a first pass downwardly through the tubes to a floating head 38 and a second pass upwardly through the tubes to outlet nozzle 28a. This type of construction is common in hydrocarbon refining processes and will be readily understood by those skilled in such processes without further explanation.

The operation of the apparatus will now be described with reference to the conversion of a hydrocarbon oil by a continuous cyclic catalytic cracking process including alternate stages of on-stream operation and stages wherein the catalyst is regenerated in situ. The preferred method of operation involves the use of two or more converters to which the feed is alternately directed, at least one converter receiving feed at all times.

Prior to the commencement of a conversion stage, the apparatus is purged of air with an oxygen-free gas, as will be hereinafter more fully described, so as to avoid the possibility of an explosive mixture being formed when oil vapors are admitted. As conversion begins, zone A is isolated from zones B and C by closing valves 22 and 33. It is undesirable that oil vapors enter zones B and C and condense therein, and as the butterfly type of valve cannot always be relied upon to seal perfectly, I may bleed a small amount of steam into these zones during conversion stages so that they will be under a positive pressure of a few inches of water with respect to zone A. During conversion stages all the valves shown in the figure are closed with the exception of those controlling the admission and withdrawal of oil vapors to be converted, these being valves 2 and 15 respectively. Fan 29 is stopped.

Vapors of the oil to be converted are separated from non-volatile material and fed to the catalyst zone through line 1, preferably at atmospheric or low superatmospheric pressure. The temperature of the vapors entering the catalyst zone may be, suitably, from about 650° to about 1000° F. depending upon the type of catalyst employed, the quality of product desired, and the character of the feed stock. Part of the vapors entering through line 1 pass downwardly through catalyst bed 4 while the remainder traverse pipe 9 and descend through catalyst bed 6. Reaction products formed during the contacting of the oil vapors with the catalyst are withdrawn through lines 11 and 13.

After a period of time, dependent upon the ratio of oil feed rate to quantity of catalyst present, the character of the feed stock, and the temperature of conversion, the activity of the two beds will begin to decrease because of carbon deposition. When the activity of the catalyst as indicated by percentage conversion has fallen to an established minimum, the flow of oil vapors to the converter is interrupted and the regeneration period begins. This stage is initiated, after cutting off the flow of vapors to be converted, by the introduction of steam through line 1 which follows the flow of the oil vapors and strips out residual oil adsorbed on the catalyst or retained within the interstices thereof. The steam and stripped oil vapors exit through lines 11 and 13, are condensed, and the residual oil recovered. An inert gas such as combustion gas purge may follow the steam purge if desired.

Valves 2 and 15 are then closed, valves 22, 33, and 14 opened, and the converter brought up to the desired regeneration pressure by admitting hot flue gas under pressure through line 12, valve 14, and line 11 from an adjoining converter in which regeneration is under way. Suitable regeneration pressures usually range from about 25 to about 100 pounds gauge per square inch, about 45 pounds pressure being preferred. Valve 37 is pre-set to maintain the selected pressure and becomes operative to bleed off the pressuring gas as its control point is reached. As soon as this occurs valve 14 is closed, blower 29 is started, plate 23 raised to its horizontal position, and valve 34 partially opened. Line 35 is connected to a source of compressed air at a pressure slightly higher than that maintained in the converter, and as valve 34 is opened some of this air begins to flow into the converter, to be picked up by blower 29 and conveyed to the catalyst beds. An equivalent volume of gas is released through line 36 by valve 37 as displaced by the entering air. The catalyst, which may have cooled somewhat during the purging between conversion and regeneration periods, has been heated by the hot pressuring gas to such a temperature that ignition of the carbon deposit occurs as the air for combustion reaches it.

As air begins to reach the carbon on the catalyst and combustion commences, the temperature of the catalyst rises rapidly. It is necessary that the temperature of the catalyst be held below a certain critical temperature, different for each catalyst, above which impairment of activity results. With catalysts of the silica-alumina type commonly employed in catalytic cracking, I prefer to limit the maximum temperature attained by the catalyst to about 1050° F.

At the same time it is desirable that the average temperature of the combustion be as high as possible without exceeding 1050° F. in order that the oxidation of the carbon on the catalyst may proceed rapidly and thus increase the percentage of on-stream time in the complete cycle.

The temperature of the catalyst during combustion will be influenced by (1) the amount of air introduced through line 35, (2) the amount of flue gas recirculated with this air, and (3) the temperature of the recirculated flue gas-air mixture.

Since (1) is controllable by valve 34, (2) by the speed of blower 29 and the positions of valves 22 and 33, and (3) by the position of the heat exchanger by-pass valve 23, the temperature within the catalyst beds could perhaps theoretically be maintained at any desired point by fixing any two of the aforementioned three variables and varying the remaining one in accordance with the rapidity of the combustion. Other factors must be taken into account, however, so that the choice of control methods is not so wide as would first appear. Variable (2) should be made as low as possible to reduce the power consumption of the blower, while variable (3) cannot be lowered indefinitely without unduly lengthening the time required to complete the regeneration stage. In view of these considerations I prefer to recirculate a constant amount of flue gas cooled to a constant temperature and to control catalyst bed temperature by varying the amount of air supplied. This method of control is a simple one and may readily be made automatic—for example, by inserting a thermocouple or other temperature-responsive device in the path of the gases traversing pipe 21 and connecting it to regulate the opening of valve 34 in the air line.

As previously mentioned, I prefer to hold the temperature of the recirculated flue gas constant, preferably at about 850° F. when adhering to the 1050° F. upper limit also previously mentioned. During the initial period of combustion the evolved heat will be partially absorbed in heating up the catalyst and the metal of the converter, so that no transfer of heat to a cooling medium in zone C is necessary—hence the initially horizontal position of plate 23, preventing passage of the recirculated flue gas through tubes 24. As the initial combustion period is passed, however, and the temperatures within the converter approach their desired upper limits, I gradually lower plate 23 from its horizontal position, so diverting a portion of the flue gas stream through the heat exchanger. When combustion is well under way, plate 23 will be adjusted to proportion the cooled to the uncooled flue gas as may be necessary to result in a temperature of 850° F. in the gas-air mixture traversing pipe 32.

When the combustion of the carbon is substantially complete I close valve 34 and lower plate 23 to a vertical position and continue to circulate through the catalyst beds to the heat exchanger and back until sufficient heat has thereby been taken from the catalyst to lower its temperature down to that at which the next-ensuing conversion stage is to be carried out. Following this brief cooling step I release flue gas through line 36 by suitable adjustment of valve 37 until the preferred conversion pressure is established.

In order to insure the absence of oxygen in the converter when oil vapors are introduced I next pass in an inert gas, such as flue gas, through line 1 and circulate it around the circuit to line 36, where it is withdrawn. After the brief purging period valves 37, 22, and 33 are closed, fan 29 disconnected, and the conversion period initiated by opening of valves 2 and 15 for the passage of oil vapors.

In order to facilitate rapid change-overs from conversion to regeneration I may provide a bypass controlled by a butterfly valve between the intake and exhaust of blower 29, namely between pipe 32 and passage 20. This is advantageous because the blower operates at high speed and if not by-passed would continue to exert pressure against valve 33 for several minutes after its prime mover was disconnected because of its residual rotational energy.

It will be understood that the arrangement of the lines and valves outside the shell of the converter is purely exemplary, as is also the choice of points for the introduction of pressuring gas and purge gas. Line 35 could be used for pressuring before regeneration quite satisfactorily. The apparatus of the invention may be of utility in connection with numerous other processes than catalytic cracking, such as dehydrogenation, polymerization, and the like. It is adaptable to processes in which it is desired to add heat to the reactants and cycle them repeatedly through the catalyst, which may be accomplished by opening valves 22 and 33 and operating fan 29 during conversion, while supplying a heat-carrying medium to the heat exchanger through nozzle 27.

Fig. 3 illustrates an alternate form of the invention which may be preferred when a somewhat larger quantity of catalyst is required than is shown in Fig. 1. In Fig. 3 the elements of the zones, except for zone C, are not so readily distinguishable, but are present and for the most part perform the same functions as in Fig. 1.

As in Fig. 1, a continuous fluid-tight shell 3' encloses the catalyst and heat-transferring zones. Zone C comprises substantially the same elements as in Fig. 1 and, except to note that it is baffled for two concentric passes instead of two semi-circular passes, need not be further described. The catalyst is disposed in a plurality (four in the figure) of ring-shaped beds 4' surrounding a central fluid-conducting pipe 32'.

The catalyst rests upon pervious supports 5'. Partitions 8' isolate the spaces communicating with the upper surfaces of catalyst beds from the spaces communicating with the lower surfaces of the beds, so defining parallel paths through the beds for the fluids.

Above the uppermost baffle 8', space 19' constituting the downstream collecting space of the catalyst beds communicates with zone C through slots or perforations 40 in the circular baffle 21'. These holes are covered by a rotatable collar 22' which also has holes adapted to be positioned in registry with the holes in the baffle or angularly displaced therefrom, whereby a valving action upon any fluid passing through the holes may be effected. This collar roughly corresponds to the butterfly valve 22 in Fig. 1. The holes in baffle 21' and the baffle itself define a path from space 19' to an annular group of tubes in the heat-exchanging device. Fluid passing upwardly through these tubes will descend through the central bundle of tubes, the lower ends of which discharge centrally within the circular baffle 21'.

The central pipe 32' extends up into the space surrounded by baffle 21' and flares outwardly to join therewith along its periphery. By this means fluid which has passed upwardly through the outer tubes and downwardly through the central tubes of the exchanger is directed into the passage defined by pipe 32'. The latter is fitted with a collar 23' which has holes 41 adapted to align with holes in the pipe as previously described with respect to baffle 21', and permitting any desired degree by by-passing of combustion gas around the heat exchanger. Hence collar 23' corresponds roughly with plate 23 in Fig. 1.

Inlet nozzle 1' passes through the outer shell 3' and a partition 8' and enables the reactants to be passed downwardly through the catalyst beds in parallel, whence they reach space 19' and are withdrawn through nozzle 11'.

The central pipe 32' extends downwardly almost to the bottom of the shell and its lower end forms the intake opening for blower 29'. A damper 33' in pipe 32' may be closed whenever necessary. The blower 29' discharges radially into a housing 31' which is joined to the outer shell at the bottom and is extended upward to define an annular passage surrounding pipe 32' which leads back to the upstream sides of the catalyst beds.

During conversion, valves 22', 23', and 33' are closed. Reactants enter nozzle 1', traverse the catalyst beds, and exit through nozzle 11'.

During regeneration, air is admitted through nozzle 1' and flue gas exhausted through nozzle 11'. A portion of the hot flue gas which has just passed down through the catalyst is drawn by blower 29' up through collar valve 22', through the heat exchanger; another portion for temperature control by-passes the heat exchanger through valve 23'. The cooled and by-passed streams combine and pass down through pipe 32', through the blower and back to the upstream sides of the catalyst beds, where they mix with the fresh air admitted for combustion. Other operations are substantially as described with reference to Fig. 1. The modified arrangement in Fig. 3 may be more readily understood by reference to cross-sectional view 3—GG, taken along the lines marked "G—G" in Fig. 3.

I claim:

1. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat-exchanging means disposed within said housing, partitioning means disposed in said housing so as to define fluid-conducting passageways for the circulation of hot combustion gas from the body of catalytic material to the heat exchanger, and for the return of cooled combustion gas from the exchanger to the body of catalyst, and impeller means disposed in one of said passageways for effecting the circulation of gas through said passageways.

2. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat-exchanging means disposed within said housing, partitioning means disposed in said housing so as to define fluid-conducting passageways for the circulation of hot combustion gas from the body of catalytic material to the heat exchanger, and for the return of cooled combustion gas from the exchanger to the body of catalyst, impeller means disposed in one of said passageways for effecting the circulation of gas therethrough, and valve means for adjusting the size of an opening in the partitioning means whereby any desired fraction of the circulating gas may be by-passed around the heat exchanger.

3. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat-exchanging means disposed within said housing, partitioning means disposed within the housing so as to provide a fluid-conducting passageway for the discharge of hot regeneration flue gas developed during the regeneration stage in the catalytic body therefrom to the heat exchanger, and another fluid-conducting passageway for the return of flue gas to the catalyst body, impeller means disposed in one of said passageways for effecting the circulation of gas therethrough, valve means for adjusting the size of an aperture between said passageways whereby any desired fraction of the gas passing through the discharge passageway may be diverted directly to the return passageway thereby by-passing the heat exchanger.

4. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat-exchanging means disposed within said housing, partitioning means disposed within the housing so as to provide a fluid-conducting passageway for the discharge of hot regeneration flue gas developed during the regeneration stage in the catalytic body therefrom to the heat exchanger, and another fluid-conducting passageway for the return of flue gas to the catalyst body, valve means for adjusting the size of an aperture between said passageways whereby any desired fraction of the gas passing through the discharge passageway may be diverted directly to the return passageway thereby by-passing the heat exchanger, and impeller means disposed in said return passageway for circulating gas therethrough.

5. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat-exchanging means disposed within said housing, partitioning means disposed in said housing so as to provide a fluid-conducting passageway for the conduction of hot combustion gas from the body of catalytic material to the heat exchanger, and another fluid-conducting passageway for the return of cooled combustion gas from the exchanger to the body of catalyst, means for closing said passageways to the passage of fluid during the on-stream period and opening them during the regeneration period, means for introducing reactants into said housing into contact with the body of catalytic material and means for withdrawing reaction products therefrom, impeller means disposed in one of said passageways for circulating gases of combustion through said passageways during the regeneration stage, means for introducing an oxidizing gas into said housing into contact with the body of catalyst during the regeneration stage, and means for withdrawing the combustion products.

6. In apparatus for the catalytic conversion of hydrocarbons and their derivatives by a cyclic process comprising alternate stages of on-stream operation over the catalyst wherein carbonaceous material is deposited thereon and a stage wherein the catalyst is regenerated in situ by passing an oxidizing gas thereover, the combination comprising a fluid-tight housing, a confined body of catalytic material and heat exchanging means disposed within said housing, partitioning means disposed in said housing so as to define a fluid-conducting passageway for the conduction of hot combustion gas from the body of catalytic material to the heat exchanger, and another fluid-conducting passageway for the return of cooled combustion gas from the exchanger to the body of catalyst, valve means for adjusting the size of an aperture between said passageway whereby any desired fraction of hot combustion gas may be by-passed around the exchanger, means for closing said passageways to the passage of fluid during the on-stream period and opening them during the regeneration period, means for introducing reactants into said housing into contact with the body of catalytic material and means for withdrawing reaction products therefrom, impeller means disposed in one of said passageways for circulating gases of combustion through said passageways during the regeneration stage, means for introducing an oxidizing gas into said housing into contact with the body of catalyst during the regeneration stage, and means for withdrawing the combustion products.

7. In apparatus for the catalytic conversion of hydrocarbons, the combination comprising a fluid-tight housing, a confined body of catalytic material and heat-exchanging means disposed within said housing, partitioning means disposed in said housing so as to define gas-conducting passageways for the circulation of gas from the body of catalytic material to the heat exchanger, and for the return of gas from the exchanger to the body of catalyst, and impeller means disposed in one of said passageways for effecting the circulation of gas through said passageways.

8. In apparatus for the catalytic conversion of hydrocarbons, the combination comprising a fluid-tight housing, a confined body of catalytic material and heat exchanging means disposed within said housing, partitioning means disposed in said housing so as to define fluid-conducting passageways for the circulation of gas from the body of catalytic material to the heat exchanger, and for the return of gas from the exchanger to the body of catalyst, impeller means disposed in one of said passageways for effecting the circulation of gas therethrough, and valve means for adjusting the size of an opening in the partitioning means whereby any desired fraction of the circulating gas may be by-passed around the heat exchanger.

9. In apparatus for the catalytic conversion of hydrocarbons, the combination comprising a fluid-tight housing, a confined body of catalytic material and heat-exchanging means disposed within said housing, partitioning means disposed in said housing so as to provide a fluid-conducting passageway for the conduction of gas from the body of catalytic material to the heat exchanger, and another fluid-conducting passageway for the return of gas from the exchanger to the body of catalyst, means for closing and opening said passageways to the passage of fluid, means for introducing gases into said housing into contact with the body of catalytic material and means for withdrawing reaction products therefrom, and impeller means disposed in one of said passageways for circulating gases through said passageways.

LEWIS E. NOFSINGER.